United States Patent
Yan

(10) Patent No.: US 9,232,340 B2
(45) Date of Patent: Jan. 5, 2016

(54) APPLICATION STORE SYSTEM AND APPLICATION DEVELOPMENT METHOD USING THE APPLICATION STORE SYSTEM

(75) Inventor: Wu Yan, Shenzhen (CN)

(73) Assignee: ZTE CORPORATION (CN)

( * ) Notice: Subject to any disclaimer, the term of this patent is extended or adjusted under 35 U.S.C. 154(b) by 134 days.

(21) Appl. No.: 13/881,832

(22) PCT Filed: Jun. 1, 2011

(86) PCT No.: PCT/CN2011/075116
§ 371 (c)(1),
(2), (4) Date: Apr. 26, 2013

(87) PCT Pub. No.: WO2012/055240
PCT Pub. Date: May 3, 2012

(65) Prior Publication Data
US 2013/0225124 A1    Aug. 29, 2013

(30) Foreign Application Priority Data

Oct. 28, 2010    (CN) .......................... 2010 1 0524455

(51) Int. Cl.
*H04W 4/00* (2009.01)
*H04L 12/14* (2006.01)
(Continued)

(52) U.S. Cl.
CPC .............. *H04W 4/003* (2013.01); *H04L 67/16* (2013.01); *H04L 67/322* (2013.01); *H04L 67/34* (2013.01); *H04W 12/08* (2013.01)

(58) Field of Classification Search
CPC ....... H04L 67/04; H04L 67/22; H04L 67/306; H04L 41/0896; H04L 65/1016; H04L 67/1002; H04L 67/1029; H04L 67/1031; H04L 67/24; H04L 69/18; H04L 69/32; H04M 15/06; H04M 15/28; H04M 15/58

USPC ............ 455/414.1, 406, 456.1; 370/254, 352, 370/259, 353, 389, 401, 392, 356, 442, 448, 370/458
See application file for complete search history.

(56) References Cited

U.S. PATENT DOCUMENTS

2004/0047354 A1 *   3/2004   Slater et al. ................... 370/400
2005/0054324 A1 *   3/2005   Chmaytelli et al. .......... 455/405
(Continued)

FOREIGN PATENT DOCUMENTS

CN          1968322          5/2007
CN       101080013 A         11/2007
(Continued)

OTHER PUBLICATIONS

International Search Report for International Patent Application No. PCT/CN2011/075116, mailed Sep. 8, 2011.

*Primary Examiner* — Inder Mehra
(74) *Attorney, Agent, or Firm* — McAndrews, Held & Malloy, Ltd.

(57) ABSTRACT

An application store system and an application development method using the application store system are provided in the disclosure. The system includes: a resource management functional entity, a developer community functional entity and an application online-store functional entity, wherein the resource management functional entity is configured to accept an operation of registering resources to the resource management functional entity and display information of the registered resources, wherein the resources include at least one of the followings: telecommunication capability resources and network resources; the developer community functional entity is configured to accept uploading of an application and review the uploaded application, wherein the application invokes the registered resources according to an invoking manner indicated by the information; and the application online-store functional entity is configured to provide an application, which is approved by the developer community functional entity, for a terminal user to download. The disclosure enhances technical supports for developers, and reduces difficulty and complexity of development.

12 Claims, 8 Drawing Sheets

(51) Int. Cl.
*H04L 29/06* (2006.01)
*H04L 29/08* (2006.01)
*H04W 12/08* (2009.01)

(56) References Cited

U.S. PATENT DOCUMENTS

2007/0100981 A1* 5/2007 Adamczyk et al. ........... 709/223
2010/0115099 A1* 5/2010 Gu ..................... H04L 47/806
                                                             709/226
2011/0289506 A1* 11/2011 Trivi et al. ................... 718/104
2014/0295804 A1* 10/2014 Naqvi ....................... 455/414.1

FOREIGN PATENT DOCUMENTS

| CN | 101480013 | 7/2009 |
| CN | 101557382 | 10/2009 |

* cited by examiner

APPLICATION STORE SYSTEM AND APPLICATION DEVELOPMENT METHOD USING THE APPLICATION STORE SYSTEM

TECHNICAL FIELD

The disclosure relates to the communication field, and more particularly to an application store system and an application development method using the application store system.

BACKGROUND

With the development of the $3^{rd}$ Generation (3G) mobile communications and smart phones, the mobile phone Internet is applied more and more widely. In such an environment, Apple Inc. has been providing iPhone applications through an application providing system (called a mobile phone application store) since 2008, and has achieved nearly 1 billion downloads in a short period of time.

The use of this mobile phone application store has brought about a large number of independent developers who develop applications independently. Major operators, mobile phone manufacturers and Internet companies will also put the launch of their respective online application stores on the agenda or have launched online application stores.

As shown in FIG. 1, major functional entities in a common application store system include an application online store and a developer community. Of course, these two functional entities may be integrated.

Major functional modules of an existing application online store include: a portal, an authentication module, an application distributing module, a supply and sales module, a service support module and an operation support module. The portal mainly provides a World Wide Web (commonly abbreviated as WEB) portal, a Wireless Application Protocol (WAP) portal and an access entry for a mobile phone client or a Personal Computer (PC) client. Through the access entry, a mobile phone terminal user may search and download applications conveniently. The authentication module provides authentication to users and applications. The application distributing module provides a function for distributing applications through various application distributing ways, such as application distribution-related functions including downloading to computers, WAP PUSH to mobile phones, transmission of addresses by text messages, and direct downloading and installation by clients etc. The supply and sales module provides management for applications sold in the application store, including: management of stores and shelves, online and offline management of applications and recommendation and ranking management.

Major functions of an existing developer community include: application uploading, application management function, forum function and developer wiki.

Thus, development of common applications can be better supported in the current system. However, in the current system, developers who expect to develop some applications that need to invoke telecommunication capability resources and/or network resources often have to search for an invoke manner by themselves or develop the resources by themselves. It is inconvenient for developers to search for the invoke manner by themselves to develop applications. It is relatively difficult and expensive for developers of small groups to develop the resources by themselves.

SUMMARY

The disclosure provides an application store system and an application development method using the application store system to at least solve the problem above.

According to an aspect of the disclosure, a resource management functional entity is provided, including: a registering module configured to accept an operation of registering resources to the resource management functional entity, wherein the resources include at least one of the followings: telecommunication capability resources and network resources; a display module configured to display information of the registered resources.

The registering module includes at least one of the followings: a first registering sub-module configured to provide an interface to receive inputted information of the resources and finish the registration of the resources; a second registering sub-module configured to receive the information of the resources through an interface between the resource management functional entity and a functional entity for providing the resources and finish the registration of the resources.

The resource management functional entity further includes: an authorization request module configured to, in response to an operation of requesting for obtaining use authorization of the resources, send an authorization request to a functional entity for providing the resources; and an authorization response module configured to, in a case that the authorization response module receives a success response returned by the functional entity for providing the resources, invoke the display module to display information used for indicating an authorization success.

The resource management functional entity further includes: a charging module configured to, in the case that the authorization response module receives the success response returned by the functional entity for providing the resources, send a charging message to a charging center so that the charging center performs charging.

The resource management functional entity further includes: a relation notification module configured to, in the case that the authorization response module receives the success response returned by the functional entity for providing the resources, notify a corresponding relation between successfully-authorized resources and an application which invokes the successfully-authorized resources to a functional entity for providing the successfully-authorized resources, so that the functional entity for providing the successfully-authorized resources performs authentication for the application which invokes the resources provided by the functional entity.

The registering module is configured to, in a case that the resources are in operation, accept the operation of registering the resources to the resource management functional entity.

According to another aspect of the disclosure, an application store system is provided, including: a resource management functional entity, a developer community functional entity and an application online-store functional entity, wherein the resource management functional entity is configured to accept an operation of registering resources to the resource management functional entity and display information of the registered resources, wherein the resources include at least one of the followings: telecommunication capability resources and network resources; the developer community functional entity is configured to accept uploading of an application and review the uploaded application, wherein the application invokes the registered resources according to an invoking manner indicated by the information; and the application online-store functional entity is configured to provide an application, which is approved by the developer community functional entity, for a terminal user to download.

The resource management functional entity is located in the developer community functional entity; or the resource management functional entity, as an independent module in the system, is coupled with the developer community functional entity in the system.

According to still another aspect of the disclosure, an application development method using the above application store system is provided, and the method includes: according to the information of the registered resources displayed by the resource management functional entity, controlling the application to invoke the registered resources; and uploading the application to the developer community functional entity.

Before uploading the application to the developer community functional entity, the method further includes: through the resource management functional entity, requesting for obtaining use authorization of the resources invoked by the application, and continuing to perform subsequent processing in a case that information used for indicating an authorization success is received.

The method further includes: registering the resources used by the application to the resource management functional entity so that the resource management functional entity displays the information of the registered resources.

By means of the disclosure, the resource management functional entity accepts an operation of registering some existing resources to the resource management functional entity, and then displays related information of these resources to a developer so that the developer can control to invoke these resources in an application according to the displayed information, thus solving the problem that it is relatively difficult and inconvenient for a developer to develop applications which invoke specific resources by using the system in the related art. With the help of the information provided by the resource management functional entity, the developer can conveniently discover telecommunication capabilities/network capabilities provided by the system, therefore the developer can invoke the telecommunication capabilities or common network capabilities in the application to develop an application provided with the telecommunication capabilities/network capabilities. In this way, the solution can enhance technical supports for developers and reduce difficulty and complexity of development.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure will be described in details below with reference to the accompanying drawings and in combination with the embodiments. It should be noted that, if there is no conflict, the embodiments in the application and the characteristics in the embodiments can be combined with each other.

Figure 1:
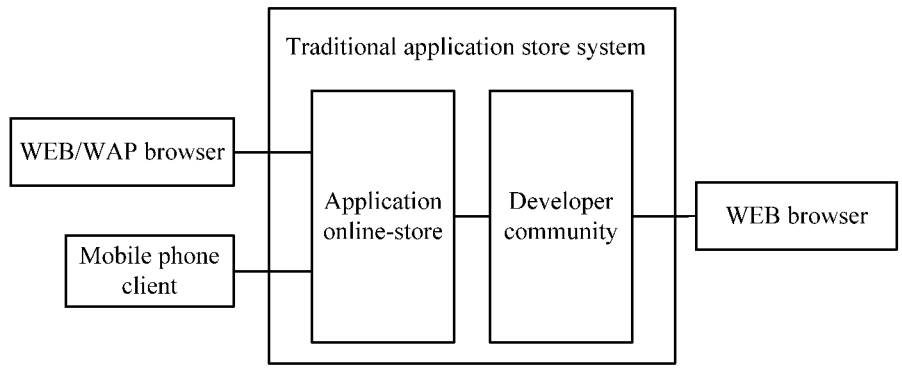
FIG. 1 is a detailed structural diagram illustrating an application store system according to the related art.
Figure 2:
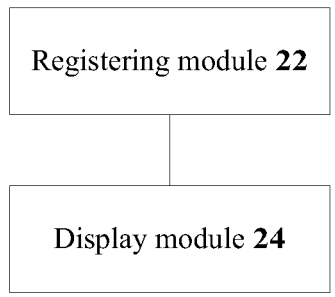
FIG. 2 is a structural diagram illustrating a resource management functional entity according to an embodiment of the disclosure.

FIG. 2 is a structural diagram illustrating a resource management functional entity according to an embodiment of the disclosure. The resource management functional entity includes: a registering module 22 configured to accept an operation of registering resources to the resource management functional entity, wherein the resources include at least one of the followings: telecommunication capability resources and network resources; a display module 24 configured to display information of the registered resources.

Through accepting the operation of registering the resources to the resource management functional entity by the registering module 22 of the resource management functional entity and then displaying the related information of these resources to a developer by the display module 24, the developer may control to invoke these resources in an application according to the displayed information. With the help of the information provided by the resource management functional entity, the developer can conveniently discover telecommunication capabilities/network capabilities provided by the system, therefore the developer can invoke the telecommunication capabilities or common network capabilities in the application to develop an application provided with the telecommunication capabilities/network capabilities. In this way, the solution can enhance technical supports for developers and reduce difficulty and complexity of development.

Figure 3:
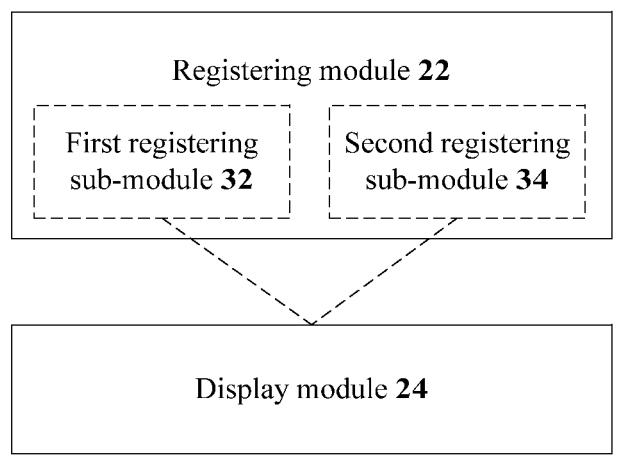
FIG. 3 is the first preferred structural diagram illustrating a resource management functional entity according to an embodiment of the disclosure.

FIG. 3 is the first preferred structural diagram illustrating a resource management functional entity according to an embodiment of the disclosure. The registering module 22 may include at least one of the followings: a first registering sub-module 32 configured to provide an interface to receive inputted information of the resources and finish the registration of the resources; a second registering sub-module 34 configured to receive the information of the resources through an interface between the resource management functional entity and a functional entity for providing the resources and finish the registration of the resources. The first registering sub-module 32 can accept network resources developed by the developer, or information of resources collected and inputted by a network manager. In this way, the registering way may be extended so that the developer can register the resources developed by the developer himself to the resource management functional entity to enrich the varieties of resources which can be provided. The second registering sub-module 34 can accept resources registered automatically by an entity for providing resources. In this way, the resource registering efficiency can be improved and maintenance costs can be saved.

Figure 4:
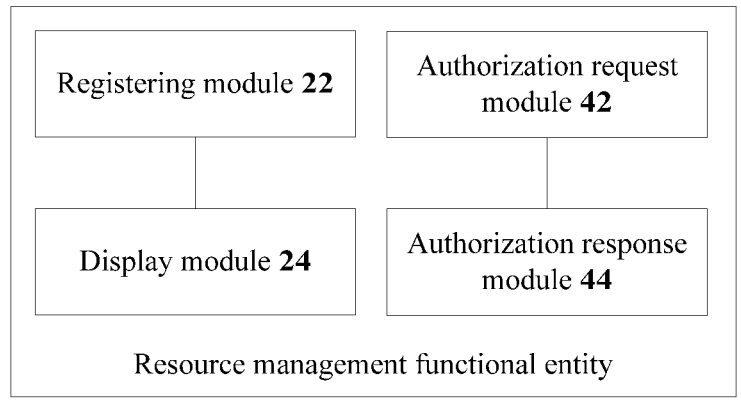
FIG. 4 is the second preferred structural diagram illustrating a resource management functional entity according to an embodiment of the disclosure.

FIG. 4 is the second preferred structural diagram illustrating a resource management functional entity according to an embodiment of the disclosure. The resource management functional entity may further include: an authorization request module 42 configured to, in response to an operation of requesting for obtaining use authorization of the resources, send an authorization request to the functional entity for providing the resources; an authorization response module 44 configured to, in the case of receiving a success response returned by the functional entity for providing the resources, invoke the display module to display information used for indicating an authorization success. Through the modules above, the request of a developer for authorizing resources can be accepted and a resource authorization function can be provided to improve the operation security of the network.

Figure 5:
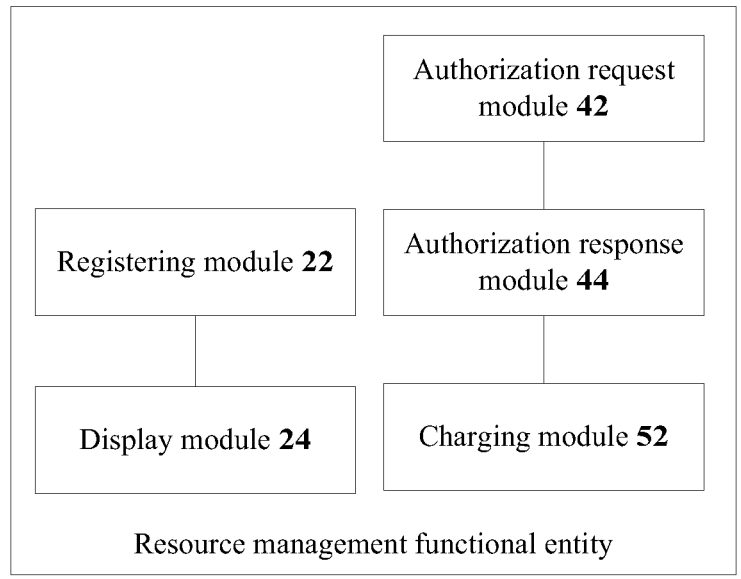
FIG. 5 is the third preferred structural diagram illustrating a resource management functional entity according to an embodiment of the disclosure.

FIG. 5 is the third preferred structural diagram illustrating a resource management functional entity according to an embodiment of the disclosure. Based on FIG. 4, the resource management functional entity may further include: a charging module 52 configured to, in the case that the authorization response module 44 receives the returned success response, send a charging message to a charging center so that the charging center performs charging. An external charging center can be connected through the charging module 52 to provide a charging function for resources used by the developer, thereby perfecting the management function of the resource management functional entity.

Figure 6:
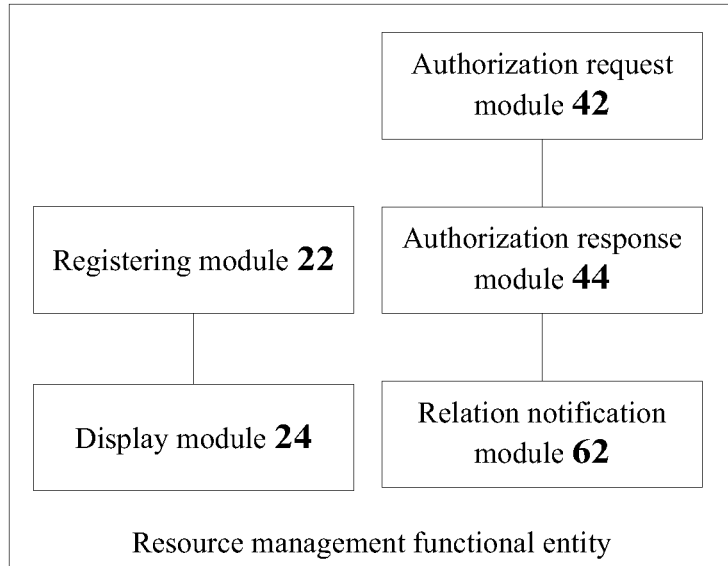
FIG. 6 is the fourth preferred structural diagram illustrating a resource management functional entity according to an embodiment of the disclosure.

FIG. 6 is the fourth preferred structural diagram illustrating a resource management functional entity according to an embodiment of the disclosure. Based on FIG. 4, the resource management functional entity may further include: a relation notification module 62 configured to, in the case that the authorization response module 44 receives the returned success response, notify a corresponding relation between successfully-authorized resources and an application which invokes the successfully-authorized resources to the functional entity for providing the successfully-authorized resources, so that the functional entity for providing the successfully-authorized resources can perform authentication for the application which invokes the resources provided by the functional entity. Through the module, a binding relation between an application and resources can be notified to a functional entity for providing the resources so that the functional entity can perform authentication to determine whether the application can use the resources during a resource invoking process.

Preferably, in order to ensure that the resources provided by the resource management functional entity are in an available state, whether the resources are in operation may be checked before the registration. In other words, the registering module 22 may accept the operation of registering the resources to the resource management functional entity only in the case that the resources are in operation. In this way, the resource management functional entity ensures the availability of the resources registered to the resource management functional entity to improve the operation stability of the system.

Preferably, the functional entity for providing the resources may be: a service platform, a telecommunication capability open gateway or other network resource providers.

An embodiment also provides an application store system. The application store system includes the resource management functional entity described above (numbered as 72 in this embodiment), a developer community functional entity 74 and an application online-store functional entity 76. The resource management functional entity 72 is configured to accept an operation of registering resources to the resource management functional entity 72 and display information of the registered resources, wherein the resources include at least one of the followings: telecommunication capability resources and network resources. The functions of the resource management functional entity 72 and modules that may be included therein have been described in the embodiments above, which will not be repeated here. The developer community functional entity 74 is configured to accept uploading of an application and review the uploaded application, wherein the application invokes the registered resources according to an invoking manner indicated by the information. The application online-store functional entity 76 is configured to provide the application, which is approved by the developer community functional entity, for a terminal user to download. Through the system, the developer can finish operations of development, uploading and sales for an application very conveniently, and especially, the system provides good support for applications that invoke network resources and/or telecommunication capability resources.

Figure 7:
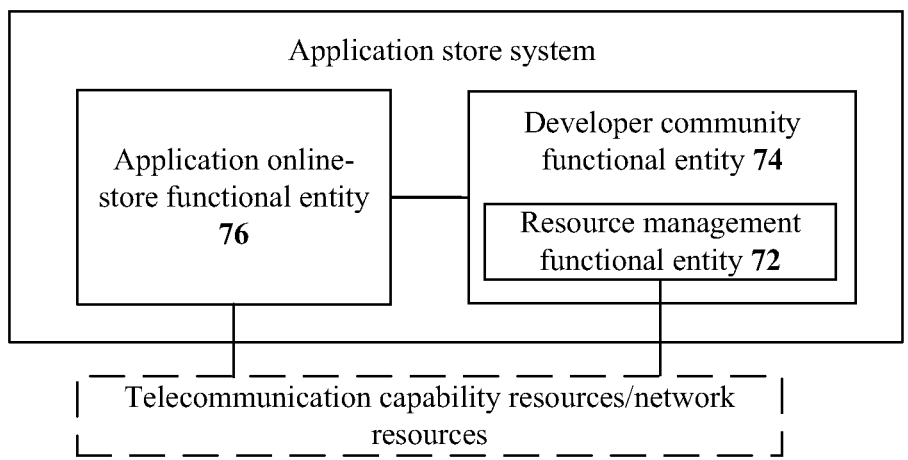
FIG. 7 is the first structural diagram illustrating an application store system according to an embodiment of the disclosure.
Figure 8:
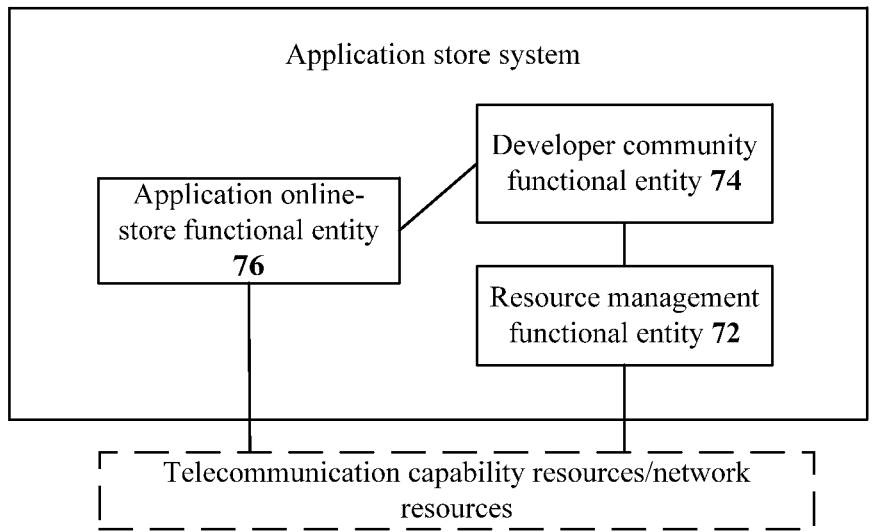
FIG. 8 is the second structural diagram illustrating an application store system according to an embodiment of the disclosure.

In the system, the resource management functional entity 72 may be located in the developer community functional entity 74, as shown in FIG. 7. Alternatively, the resource management functional entity 72, as an independent module in the application store system, is coupled with the developer community functional entity 74 in the application store system, as shown in FIG. 8.

Figure 9:
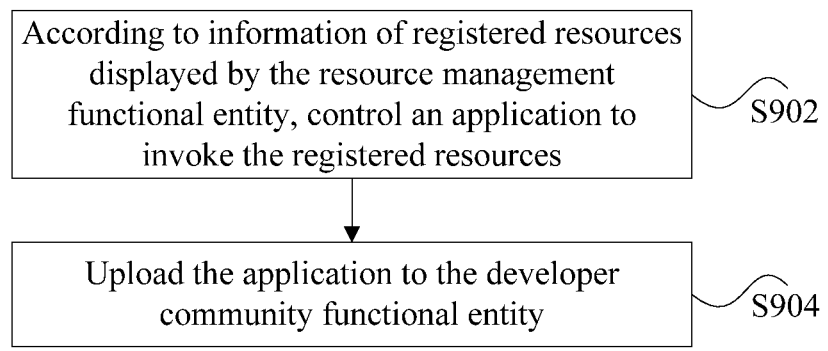
FIG. 9 is a flowchart of an application development method using an application store system according to an embodiment of the disclosure.

An embodiment also provides an application development method using the application store system described above. FIG. 9 is a flowchart of an application development method using the application store system according to an embodiment of the disclosure. The method includes the following steps.

Step 902: According to the information of the registered resources displayed by the resource management functional entity 72, an application is controlled to invoke the registered resources.

Step 904: The application is uploaded to the developer community functional entity 74.

Through the method above, according to the information of the registered resources displayed by the resource management functional entity 72, a developer may control the application to invoke the resources during the development of the application so as to develop the application that invokes the resources. Through the method, the developer can conveniently develop applications provided with telecommunication capabilities/network capabilities by using the module.

Preferably, before uploading the application to the developer community functional entity 74, the developer can request, through the resource management functional entity 72, for obtaining use authorization of the resources invoked by the applications and subsequent processing is continued in the case of receiving the displayed information used for indicating the authorization success. Through the resource management functional entity 72, the developer may request for obtaining authorization of resources that need to be used by the developer and after receiving the request, the resource management functional entity 72 initiates a request to the functional entity for providing the resources, and displays an authorization success message to the developer after receiving a success response. In this way, the developer learns that the resources that need to be used have been authorized. The resource management functional entity 72 helps to perform the authorization request operation, thereby greatly facilitating usage of the developer.

Preferably, the resources used by the application can be also registered to the resource management functional entity 72 by a registering module so that the resource management functional entity 72 can display the information of the registered resources. In this way, the developer may also register resources provided by the developer to the resource management functional entity 72 so that the developer or other developers can use the resources, thus extending the use application of the resources and improving the utilization of the resources.

Embodiment 1 to embodiment 4 described below integrate the technical solutions of multiple preferred embodiments above.

Embodiment 1

Figure 10:
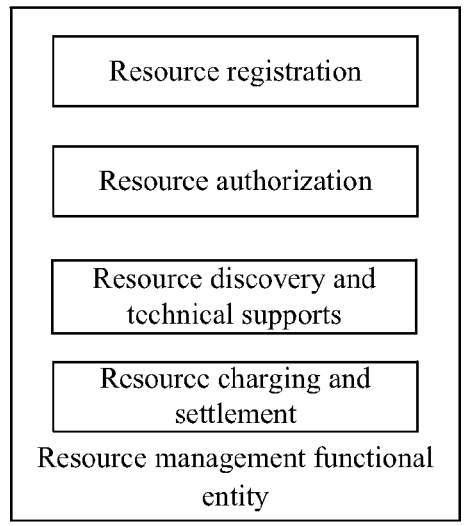
FIG. 10 is a functional structural diagram of a resource management functional entity according to the first embodiment of the disclosure.

The present embodiment describes major functions realized by a resource management functional entity in details. FIG. 10 is a functional structural diagram of a resource management functional entity according to the first embodiment of the disclosure. The resource management functional entity includes functions as follows.

A resource registering function is used for a manager to register, via an interface, available telecommunication capability resources to a system so that the telecommunication capability resources can be used by a developer, or the telecommunication capability resources may be registered automatically from an external telecommunication capability service environment by an interface, wherein the resources refer to resources to be invoked by applications developed by the developer, such as telecommunication resources, or charged or free network resources, or network resource services provided by the developer. The service environment refers to a service generating environment of telecommunication capability combinations. The environment may provide telecommunication capability combinations to generate telecommunication services which can be invoked by applications.

A resource authorization function is used for authorizing use of resources for the developer. Only when authorized, the developer can invoke resources and capabilities registered in the system normally. For the authorization of telecommunication resources and capabilities, message interaction needs to be performed with a service environment (also known as a service platform) providing the telecommunication resources and capabilities. Only after obtaining authorization of the service environment, the resource management functional entity can finish the authorization of telecommunication capabilities and resources for the developer. Before initiating an application, the resource management functional entity may also determine whether the application needs to be applied in the service platform. If the application needs to be applied in the service platform, a resource application request is sent to the service platform, if the service platform returns a success message, the authorization is successful; if the success message is not received, the authorization is unsuccessful. Access to those applications (authorization of the system is not important for other network capabilities or services developed by the developer himself and put at a network side) which do not need to be authenticated in the service platform will be opened in the system automatically. Through the structure above, the security of the system is further improved. The network capabilities and the services developed by the developer and put at the network side are registered in the system mainly because the capabilities can be discovered by more developers in a community so as to popularize the network capabilities. Functions including charging and settlement etc. for the network capabilities need to be retained in the system.

A resource discovery function and a resource technical support function is that when new resources are registered in the system, the developer can discover the new resources and use instructions thereof in the resource management functional entity, and after obtaining authorization of the resources, the developer can develop an application having a capability provided by the resources according to the use instructions.

A resource charging and settlement function is provided in the system because resources registered in an application store system may be free or charged. The charging and settlement function can be realized by providing an interface with an external charging and settlement system.

The resource management functional entity is added in the application store system so that the developer can conveniently discover telecommunication capabilities/network capabilities provided by the system. After obtaining the authorization of the capabilities and resources, the developer can develop applications having the telecommunication capabilities/network capabilities according to corresponding technical supports provided by the system. For operators, the resource management functional entity is added in the application store system to improve the user experience of a common application store and enhance technical supports for developers so that the developers can use the module to develop applications having telecommunication capabilities/ network capabilities conveniently. The system provides access to a telecommunication capability open gateway and the service environment for the developers. Moreover, the system is able to keep consistent with technical markets and can integrate network capabilities to be provided to the developers. The measures above ensure the interests of the operators and improve the competitiveness of the operators in the field of application stores in the future.

There are two kinds of resources in the application store system: 1. telecommunication capabilities; 2. network resources. The telecommunication capability resources may be services in any forms, which are provided with telecommunication capabilities and provided by the service platform or the telecommunication capability open gateway. The range of the network resources is wider. For example, user information of a Social Networking Service (SNS) website is generally opened in the form of Representational State Transfer (REST) at present, and the resource may be also used by developers during application development. In the application store system, in order to facilitate application development of developers, operator managers may also collect free resources of the Internet in the resource management functional entity, and register the resources to the system to be used by the developers, and the developers can discover the resources in the resource discovery function more quickly.

Applications can use resources by invoking resource capabilities through an invoking interface for invoking corresponding resources. For example, provided that a text message sending function is needed in an application A, when a developer discovers in a developer community that there is a text message telecommunication capability resource provided, the developer acquires that the text message capability can be used by invoking a web service interface and the text message capability, the charge of which is 10 Yuan/month, needs to be applied. The user applies for the resource in the resource management functional entity of the developer community, the application store system initiates an application request to the service platform, the service platform returns an application success, the resource charging and settlement module records specific information of the application, if rating needs to be performed, interaction needs to be performed with a service charging and settlement system. After the above procedure, the application which is developed by the developer and provided with the text message sending function can send text messages normally. The interface for the application to invoke the capability may be in any forms including Simple Object Access Protocol (SOAP) and REST, which depends on application invoking convenience. The above procedure can be implemented easily, which will not be detailed here.

Embodiment 2

For the application store system provided by the first embodiment, the resource management functional entity may serve as a functional sub-module of the developer community, as shown in FIG. 7, or serve as an independent functional sub-module existing in the application store system, as shown in FIG. 8. Description will be made below by taking the resource management functional entity serving as a functional sub-module of the developer community as an example.

Figure 11:
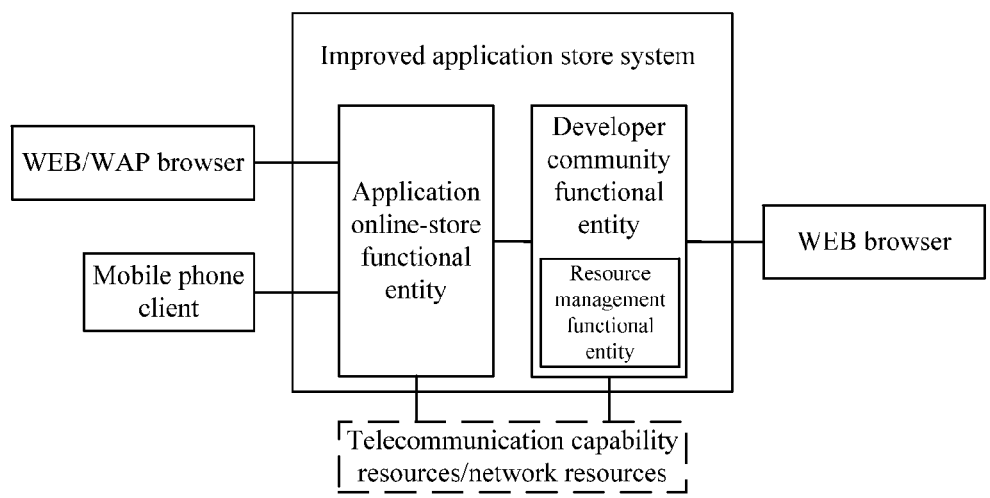
FIG. 11 is a detailed structural diagram of an application store system according to the second embodiment of the disclosure.

FIG. 11 is a detailed structural diagram of an application store system according to the second embodiment of the disclosure. The application store system includes functional modules as follows.

A developer community functional entity is configured to accept uploading of applications and review the uploaded applications. The functional entity provides functions including application uploading, application management, application testing and forum function etc. for developers. At the same time, operator managers can also publish Software Development Kits (SDK), provide technical supports and perform flow management including reviewing and testing applications etc. in the functional entity.

An application online-store functional entity is configured to provide applications, which are approved by the developer community functional entity, for terminal users to download. The functional entity provides WEB portals, WAP portals and mobile phone clients which can be accessed by mobile phone terminal users. The users can query applications, purchase applications and download applications. In the meanwhile, the operator managers can manage the flow for making mobile phone applications available in the online-store.

The developer community functional entity also includes a resource management functional module. The resource management functional module provides telecommunication resources, network resources and technical supports corresponding to the telecommunication resources and network resources to developers. In the application store system having the module, the developers can conveniently discover resources and capabilities provided by the application store system, and invoke these telecommunication capabilities/network capabilities registered in the system during application development. In other words, the resource management functional entity actually establishes an interface between a developer and a service platform providing telecommunication capabilities, so that the developer can invoke telecommunication capabilities and resources conveniently. The system perfectly combines the application store with the telecommunication capabilities/network capabilities.

Figure 12:
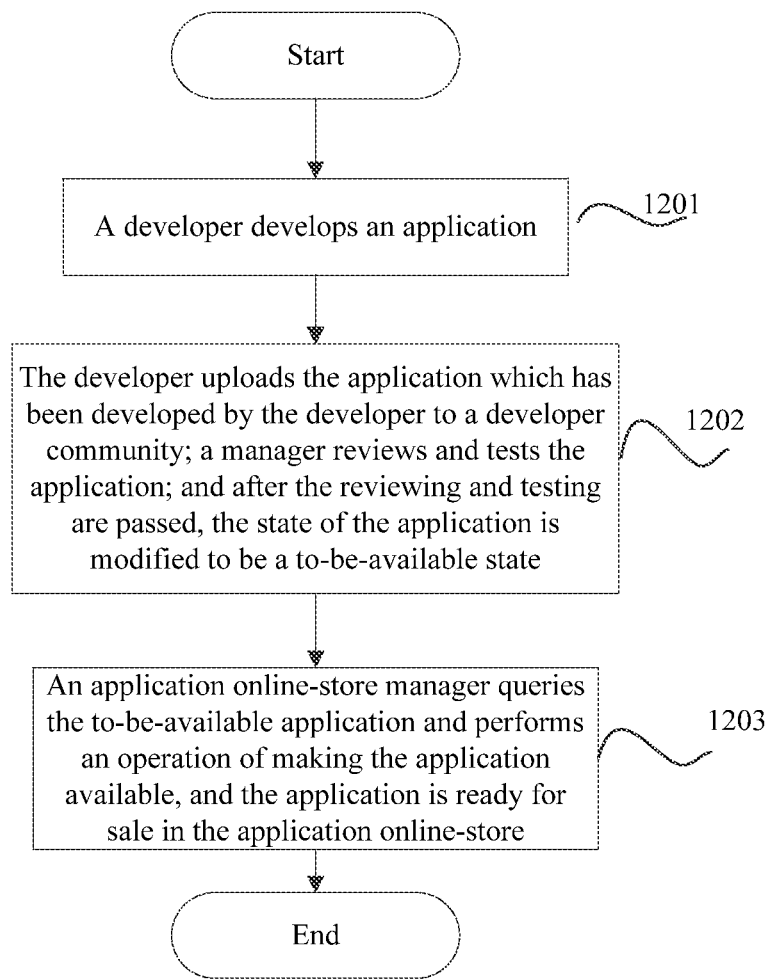
FIG. 12 is a flowchart illustrating implementation of basic application development and uploading by a developer using the application store system according to the second embodiment.

FIG. 12 is a flowchart illustrating implementation of basic application development and uploading by a developer using the application store system according to the second embodiment. The flow includes the following steps.

Step 1201: A developer develops an application in a development environment of a mobile phone operation system and generates an application program package (development environments, development tools, program packet formats and suffixes of different mobile phone applications are different). The development environment is provided by a development tool of the mobile phone operation system. For example, if the developer needs to develop an application of an android operation system, the development needs to be performed by using a development tool of an android mobile phone application, wherein eclipse and android development plug-ins thereof and are typical android development tools. If the developer needs to develop an iPhone mobile phone application, the development needs to be performed by using a development tool xtool of Apple in a development environment of an MAC operation system.

Step 1202: The developer fills application information in a developer community and uploads the program packet. A developer community manager reviews and tests the application, and the application is to be available after the application is approved and the testing is completed.

Step 1203: An application online-store manager performs an operation of making the to-be-available application available in the store, and the application is ready for sale to terminal users after being made available in the store successfully.

Figure 13:
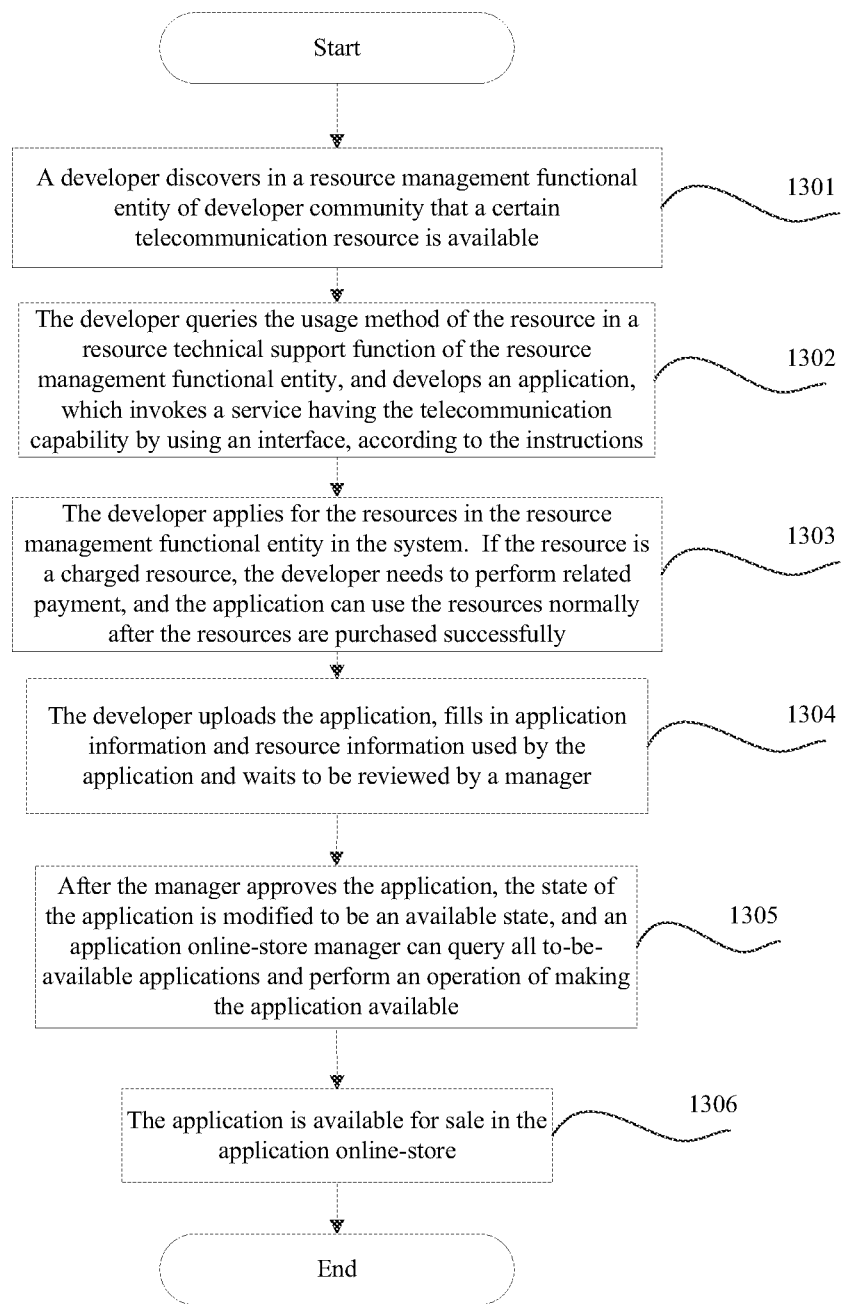
FIG. 13 is a flowchart illustrating implementation of development and uploading of an application having a telecommunication capability by a developer using the application store system according to the second embodiment.

Using the application store system above, the developer can not only develop a common application, but also develop and upload an application having a telecommunication capability. FIG. 13 is a flowchart illustrating implementation of development and uploading of an application having a telecommunication capability by a developer using the application store system according to the second embodiment, including the following steps.

Step 1301: A developer discovers in a resource management functional entity of a developer community that the system provides certain telecommunication capability resources.

Step 1302: The developer queries the usage method of the resource in a resource technical support function of the resource management functional entity, and develops an application, which invokes a service having the telecommunication capability by using an interface, according to the instructions.

Step 1303: The developer applies for the resources in the resource management functional entity in the system. If the resource is a charged resource, the developer needs to perform related payment, and the application can use the resources normally after the resources are purchased successfully.

Step 1304: The developer fills basic information of the application and the capability used by the application and uploads an application program packet to the developer community.

Step 1305: The developer community manager reviews and tests the application information uploaded by the developer, conditions of the resources used by the application, and the application program packet. After passing the reviewing and testing, the application is in a to-be-available state (the to-be-available application is officially on sale in an online-store after an online-store manager performs an operation of making the application available).

Step 1306: The application online-store manager performs processing of making the to-be-available application available, and the application is officially on sale in the application online-store functional entity.

By using the application store system of the present embodiment, not only a common application, but also an application having a telecommunication capability/network capability can be developed. To describe functions of each functional entity of the system in details, a process in which an operator manager registers resources in an application store system will be described below in the third embodiment. Registration of telecommunication resources and network resources to the application store system for the use of developers during development of applications can be regarded as a major characteristic of the application store. Adding a resource management functional entity to an application store system to manage resources is actually the simplest and most convenient method to integrate various telecommunication resources owned by the application store and operators and all network resources.

Embodiment 3

Figure 14:
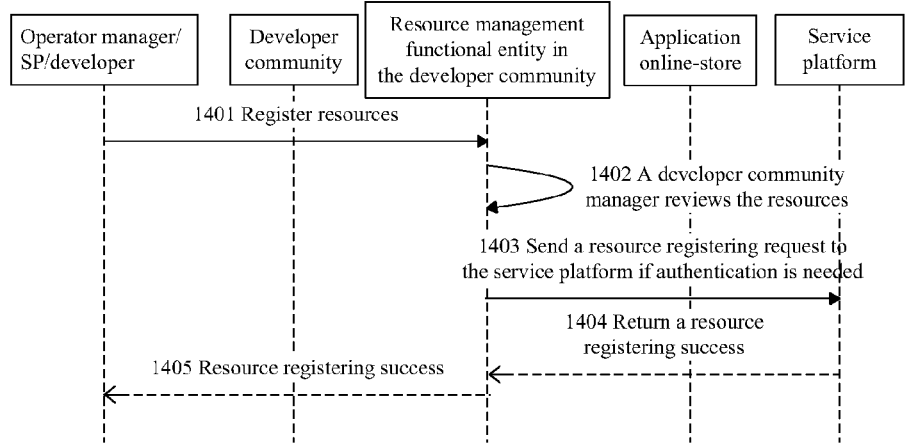
FIG. 14 is a flowchart illustrating processing in which an operator manager registers resources to a system for use of a developer according to the third embodiment.

FIG. 14 is a flowchart illustrating processing in which an operator manager registers resources to the system for the use of a developer according to the third embodiment. As shown in FIG. 14, the process of registering the resources to the application store system by the operator manager includes the following steps, Step 1401: The operator manager fills service information in a resource management functional entity of a developer community of an application store to register a service. Basic service information which needs to be filled in may be, for example, a service name, a service function, a service invoking method, a service price and a service authority etc.

Step 1402: The operator manager reviews a resource registering request.

Step 1403: If the resource registering request is approved, the system needs to determine whether a service state needs to be queried in a service platform. If the service state needs to be queried in the service platform, the system sends a message to the service platform to examine the service, and only a service in operation can be registered into the application store.

Step 1404: The service platform returns a response message of a resource registration application success to the resource management functional entity of the application store.

Step 1405: The resource management functional entity of the application store system registers the service into the system only after receiving a correct message of the service registration application request returned by the service platform. So far, the developer can discover the telecommunication resources by browsing all resources in the application store.

The resources can be registered by the operator manager or a Service Provider (SP). Of course, the resources can also be registered by an experienced developer and is not limited by the operator manager.

Experienced developers can register a service in the application store system after developing and deploying the service in the service platform, and then upload an application that uses the service. The fourth embodiment describe a complete flow in which an experienced developer uses the system to register resources, develops an application having a telecommunication capability and uploads the application until the application is ready for sale.

Embodiment 4

Figure 15:
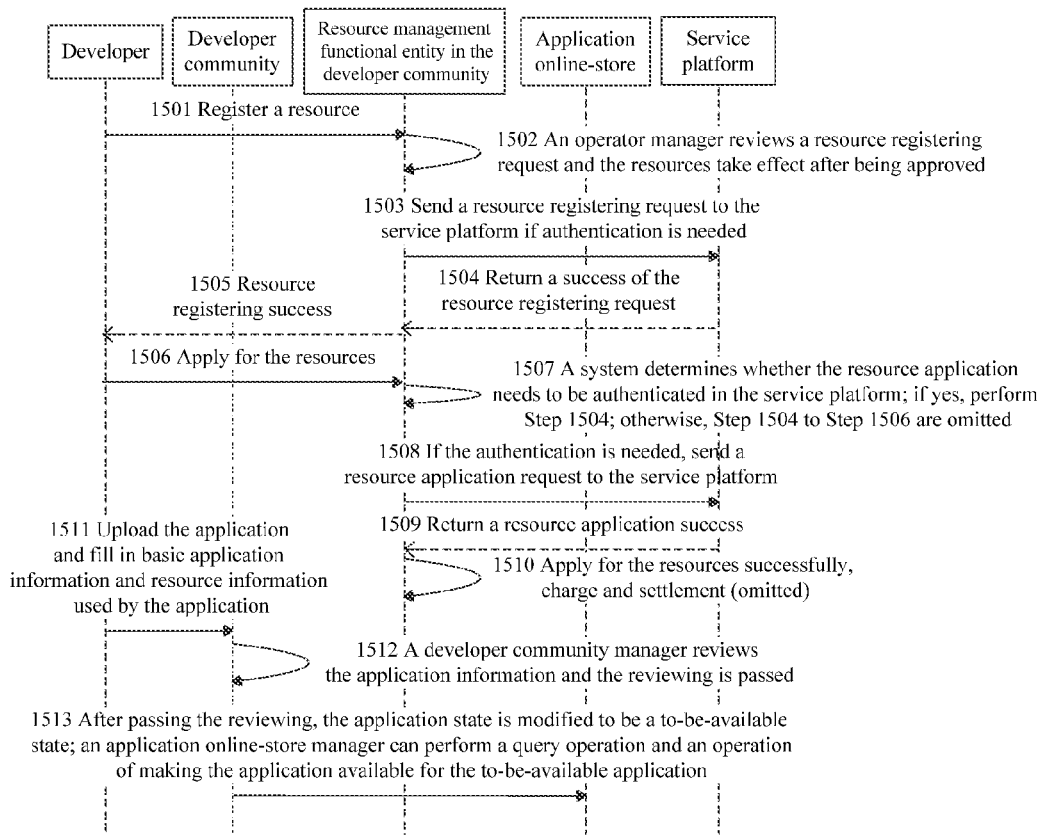
FIG. 15 is a flowchart illustrating processing in which an experienced developer uses an application store system to register a telecommunication capability and develop an application having the telecommunication capability according to the fourth embodiment of the disclosure.

FIG. 15 is a flowchart illustrating processing in which an experienced developer uses an application store system to register a telecommunication capability and develop an application having the telecommunication capability according to the fourth embodiment of the disclosure. The experienced developer is a developer who uses a tool provided by a service platform to develop a telecommunication service in the service platform. After the service operates online officially in the service platform, the developer hopes to register the service in the application store so that the service can be used by the developer or other developers. As shown in FIG. 15, the flow in which the developer uses the application store system to register the telecommunication capability and develop the application includes the following steps.

Step 1501: The developer fills service information in a resource management functional entity of a developer community of an application store to register a service. Basic service information which needs to be filled in may be, for example, a service name, a service function, a service invoking method, a service price and a service authority etc.

Step 1502: An operator manager reviews a resource registering request.

Step 1503: If the resource registering request is approved, the system needs to determine whether a service state needs to be queried in the service platform. If the service state needs to be queried in the service platform, the system sends a message to the service platform to examine the service, and only a service in operation can be registered into the application store.

Step 1504: The service platform returns a response message of a resource registration application success to the resource management functional entity of the application store.

Step 1505: The resource management functional entity of the application store system registers the resource into the system only after receiving a correct message of the service registration application request returned by the service platform. So far, the developer can discover the telecommunication resources by browsing all resources in the application store.

Step 1506: In the resource management functional entity of the developer community, the developer applies to use the resources.

Step 1507: A developer community manager reviews the application; if the application is approved, the system further needs to determine whether the resource application needs to be authenticated in the service platform.

Step 1508: If the authentication needs to be performed, the system sends a resource application request to the service platform.

Step 1509: The service platform returns a resource application success message to the resource management functional entity of the developer community of the application store.

Step 1510: The resources are applied successfully; if the resources are charged resources, the developer needs to perform related payment. The specific charging process may need to interact with a charging and settlement system, which will not be repeated in this step. After the resources are purchased successfully, the application can use the resources normally.

Step 1511: The developer fills in basic information of the application and the capability used by the application and uploads an application program packet to the developer community.

Step 1512: The developer community manager reviews and tests the application information uploaded by the developer, conditions of the resources used by the application, and the application program packet. After passing the reviewing and testing, the application is in a to-be-available state (the to-be-available application is officially on sale in an online-store after an online-store manager performs an operation of making the application available).

Step 1513: The application online-store manager performs processing of making the to-be-available application available, and the application is officially on sale in the application online-store functional entity.

For the development of a common application, the major operation performed by the developer in the application store system is to upload a corresponding application program packet. The uploaded mobile phone application is ready for sale to terminal users after a series of online-store reviewing and testing processes.

If the common application needs a server to provide a service, the developer can interact with his/her own server via a private interface in the application. For example, provided that the developer needs to develop a mobile phone application A which is a mobile phone application client of a website B. The application A can obtain updated news and a friend list of the website B when connecting to the Internet. When using the application A to browse a piece of news, a terminal user may choose to send a text message or a multimedia message to a friend in the website. According to development principles of common applications, the mobile phone application A may be understood as a client of the website B, and the website B may be understood as a server of the mobile phone application A. The mobile phone application A may use a private interface (or may be a corresponding REST open interface provided by the website B) to initiate a request to B directly to obtain the updated news. When a text message/multimedia message needs to be sent, a request also needs to be initiated to B via a corresponding interface. It should be noted that transmission of text message/multimedia message or providing of news contents are functions which are provided by B via a corresponding interface to be invoked by A.

According to traditional operation and development modes, when the website B needs to use a telecommunication capability provided by an operator during an operation process, B needs to serve as an SP to apply for and purchase the corresponding capability from the operator, which is feasible for an enterprise or a large-scale website. However, small and medium-scale common developers fail to use telecommunication capabilities provided by operators in their own programs because of the lack of corresponding SP qualification. The utilization of the system provided by the first embodiment enables small and medium-scale independent developers to also develop applications having telecommunication capabilities provided by operators.

In the Step 1501, the service refers to a service process formed by one or more telecommunication capabilities. For example, a simple service may be a service which sends the content of a text message to a certain mobile phone. A development process of the service includes the followings. 1. The developer downloads a service development tool and learns to use the development tool. 2. The developer uses the development tool to develop the service, designs an invoking interface of the service in a manner that the mobile phone number and text message content are entry parameters and a returned result of a sending success or failure is a return parameter. 3. The developed service process is: a user reads the mobile phone number and the text message content, sends the text message by an atomic service with a text message sending capability provided in the development tool, reads a returned result of the atomic service, takes the result as a return parameter of service invoking and returns the result to a service invoker.

A combined service may be a more complicated service formed by one or more telecommunication capabilities. For example, the service may determine whether a mobile phone terminal is in a geographic area, and send an advertisement text message to the mobile phone if the mobile phone terminal is in the geographic area. A development process of the service includes the followings. 1. The developer downloads a service development tool and learns to use the development tool. 2. The developer designs an invoking interface of the service in a manner that a user mobile phone number, a geographical location of an advertisement store owner and contents of the advertisement text message are entry parameters and a returned result of a text message sending success, absence of a user in an area, or a text message sending failure is a return parameter. 3. The developed service process is: the service reads the user mobile phone number and the geographical location of the advertisement store owner, and invokes an atomic service of locating according to the user mobile phone number and the geographical location of the advertisement store owner; the atomic service returns a relative distance; the service performs judgment according to the relative distance, sends an advertisement text message to the mobile phone user if the relative distance is shorter than 1 kilometer, and does not perform any operation if the relative distance is longer than 1 kilometer; and the service returns a returned result of the service operation to a service invoker.

Experienced developers can develop the service having the telecommunication capability according to a service development tool provided by the service platform, wherein the service development tool is a tool provided by the service platform for developers. A method for invoking a telecommunication capability is packaged, and what the developers do is to assemble atomic services provided in the tool by a small number of script control logics. However, for a bottom layer, the service invokes the telecommunication capability by invoking an interface of a capability open gateway. For operators, the service development tool is provided to make development easier for the developers and create better conditions for the developers to develop services rapidly and conveniently. The service development tool is developer-oriented and SP-oriented with a major function to utilize various telecommunication capabilities and atomic services provided in the tool to realize some telecommunication capability services with logic. A service developed by using the service development tool may invoke a service by an interface, and this service is triggered by invoking an invoking interface of the service by an invoker. Specific functions and implementation of the service platform and the service development tool provided by the service platform are not described in detail herein.

A management process of telecommunication capabilities/network capabilities is described in the Step 1510. The developer can purchase the telecommunication capabilities/network capabilities in a telecommunication capability resource functional entity (authorization of the telecommunication capabilities/network capabilities is obtained through purchase). Theoretically, the telecommunication capabilities may be charged while the network capabilities are generally free. After purchasing the telecommunication capabilities/network capabilities, the developer needs to perform a binding operation for his/her own applications and resources/capabilities. In addition, the binding needs to be synchronized to the service platform in the case that the service platform needs to perform authentication for a use authority of a service. The binding process is performed to authenticate, in the service platform, an application which invokes a service.

Binding of an application and the resource/capability is described in the Step 1511. It is necessary for the developer to apply for the capability in the developer community and upload the application first during the binding of the application and the resource/capability. The application store system sends a request to the service platform for a capability which needs to be authenticated by the service platform. When the application invokes a telecommunication capability, the service platform authenticates a binding relation between the application and the resource/capability. For example, the developer uploads applications A1 and A2 and purchases a text message capability S1 and a locating capability S2, and the application A1 uses the two capabilities S1 and S2. If the developer binds the application A1 and the purchased text message capability S1 and the purchased locating capability S2, during an execution process of A1, the service platform determines whether there is a binding relation between the application A1 and the telecommunication capability S1 when receiving a capability invoking request of A1. The A1 will be executed only when the telecommunication capability exists; otherwise, the service is executed unsuccessfully. It is the same for the telecommunication capability S2. The binding relation between the service and the telecommunication capability may be multiple-to-multiple. In other words, S1 may be bound with A1 and A2, and S2 may be also bound with A1 and A2. The binding is performed in order to determine whether an application is authorized to use a service during an execution process of the application. If the application is not bound with a service, an error will be reported when the service is invoked.

To sum up, through the solution provided by the embodiments of the disclosure, developers can discover telecommunication capabilities/network capabilities provided by a system conveniently so as to invoke the telecommunication capabilities or common network capabilities in applications to develop applications having the telecommunication capabilities/network capabilities, thus enhancing technical supports for developers, and reducing difficulty and complexity of development.

What needs to be explained is that, the steps illustrated in the flowcharts of the accompanying drawings may be implemented by computer systems, such as a group of computer-executable instructions. In addition, although logical sequences have been illustrated in the flowcharts, the steps as illustrated or described may be executed according to sequences different from those described herein in some cases.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A resource management functional entity device, comprising a hardware processor configured to execute software program units, wherein the software program units comprise:
   a registering module configured to accept an operation of registering resources to the resource management functional entity, wherein the resources comprise telecommunication capability resources and network resources;
   an authorization request module configured to, in response to an operation of requesting for obtaining use authorization of the resources, send an authorization request to a functional entity for providing the resources;
   an authorization response module configured to, in a case that the authorization response module receives a success response returned by the functional entity for providing the resources, invoke the display module to display information used for indicating an authorization success;
   a relation notification module configured to, in the case that the authorization response module receives the success response returned by the functional entity for providing the resources, notify a corresponding relation between successfully-authorized resources and an application which invokes the successfully-authorized resources to a functional entity for providing the successfully-authorized resources, so that the functional entity for providing the successfully-authorized resources performs authentication for the application which invokes the resources provided by the functional entity;
   a display module configured to display information of the registered resources.

2. The resource management functional entity according to claim 1, wherein the registering module comprises at least one of the followings:
   a first registering sub-module configured to provide an interface to receive inputted information of the resources and finish the registration of the resources;
   a second registering sub-module configured to receive the information of the resources through an interface between the resource management functional entity and a functional entity for providing the resources and finish the registration of the resources.

3. The resource management functional entity according to claim 1, further comprising:
   a charging module configured to, in the case that the authorization response module receives the success response returned by the functional entity for providing the resources, send a charging message to a charging center so that the charging center performs charging.

4. The resource management functional entity according to claim 1, wherein the registering module is configured to, in a case that the resources are in operation, accept the operation of registering the resources to the resource management functional entity.

5. An application store system, comprising: a resource management functional entity, a developer community functional entity and an application online-store functional entity, wherein
the resource management functional entity is configured to accept an operation of registering resources to the resource management functional entity and display information of the registered resources, wherein the resources telecommunication capability resources and network resources,
wherein the resource management functional entity is further configured to: in response to an operation of requesting for obtaining use authorization of the resources, send an authorization request to a functional entity for providing the resources; in a case that receiving a success response returned by the functional entity for providing the resources, invoke the display module to display information used for indicating an authorization success; in the case that receiving the success response returned by the functional entity for providing the resources, notify a corresponding relation between successfully-authorized resources and an application which invokes the successfully-authorized resources to a functional entity for providing the successfully-authorized resources, so that the functional entity for providing the successfully-authorized resources performs authentication for the application which invokes the resources provided by the functional entity;
the developer community functional entity is configured to accept uploading of an application and review the uploaded application, wherein the application invokes the registered resources according to an invoking manner indicated by the information; and
the application online-store functional entity is configured to provide an application, which is approved by the developer community functional entity, for a terminal user to download.

6. The system according to claim 5, wherein the resource management functional entity is located in the developer community functional entity; or the resource management functional entity, as an independent module in the system, is coupled with the developer community functional entity in the system.

7. An application development method, wherein the method is applied in an application store system, wherein the application store system comprises a resource management functional entity, a developer community functional entity and an application online-store functional entity, wherein the resource management functional entity is configured to accept an operation of registering resources to the resource management functional entity and display information of the registered resources, wherein the resources comprise at least one of the followings: telecommunication capability resources and network resources, wherein the resource management functional entity is further configured to: in response to an operation of requesting for obtaining use authorization of the resources, send an authorization request to a functional entity for providing the resources; in a case that receiving a success response returned by the functional entity for providing the resources, invoke the display module to display information used for indicating an authorization success; in the case that receiving the success response returned by the functional entity for providing the resources, notify a corresponding relation between successfully-authorized resources and an application which invokes the successfully-authorized resources to a functional entity for providing the successfully-authorized resources, so that the functional entity for providing the successfully-authorized resources performs authentication for the application which invokes the resources provided by the functional entity; the developer community functional entity is configured to accept uploading of an application and review the uploaded application, wherein the application invokes the registered resources according to an invoking manner indicated by the information; and the application online-store functional entity is configured to provide an application, which is approved by the developer community functional entity, for a terminal user to download; and the method comprises:
according to the information of the registered resources displayed by the resource management functional entity, controlling the application to invoke the registered resources; and
uploading the application to the developer community functional entity.

8. The method according to claim 7, wherein before uploading the application to the developer community functional entity, the method further comprises: through the resource management functional entity, requesting for obtaining use authorization of the resources invoked by the application, and continuing to perform subsequent processing in a case that information used for indicating an authorization success is received.

9. The method according to claim 7, further comprising: registering the resources used by the application to the resource management functional entity so that the resource management functional entity displays the information of the registered resources.

10. The method according to claim 7, wherein
the resource management functional entity is located in the developer community functional entity; or the resource management functional entity, as an independent module in the system, is coupled with the developer community functional entity in the system.

11. The method according to claim 10, wherein before uploading the application to the developer community functional entity, the method further comprises: through the resource management functional entity, requesting for obtaining use authorization of the resources invoked by the application, and continuing to perform subsequent processing in a case that information used for indicating an authorization success is received.

12. The method according to claim 10, further comprising: registering the resources used by the application to the resource management functional entity so that the resource management functional entity displays the information of the registered resources.

* * * * *